United States Patent [19]
Nuccel

[11] 3,777,106
[45] Dec. 4, 1973

[54] ELECTROSLAG WELDING MACHINE
[75] Inventor: Albert W. Nuccel, Harrisburg, Pa.
[73] Assignee: Teledyne, Inc., York, Pa.
[22] Filed: June 13, 1972
[21] Appl. No.: 262,191

[52] U.S. Cl.................. 219/76, 219/60 A, 219/161
[51] Int. Cl............................................... B23k 9/04
[58] Field of Search.................... 219/76, 60 A, 137, 219/161

[56] References Cited
UNITED STATES PATENTS
| | | | |
|---|---|---|---|
| 2,191,478 | 2/1940 | Hopkins | 219/76 |
| 2,191,481 | 2/1940 | Hopkins | 219/76 X |
| 3,627,973 | 12/1971 | Smith | 219/125 R |
| 2,902,588 | 9/1959 | Zouck et al. | 219/76 |

Primary Examiner—R. F. Staubly
Assistant Examiner—L. A. Schutzman
Attorney—Luke A. Mattare et al.

[57] ABSTRACT

An electroslag welding machine for depositing or casting a layer of metal onto an article, comprising a frame means having means thereon for supporting an article, welding electrode means carried on a first movable portion of the frame means and disposed in close proximity to said article for depositing weld metal onto said article, cooling and shaping means carried on a second movable portion of the frame means spaced from the first movable portion and disposed in closely spaced relationship to said article to define a space therebetween, the welding electrode means extending into the space between the article and the cooling and shaping means, and drive means carried by the frame means and connected to at least one of said movable portions to cause movement thereof, said first and second movable portions being connected together for movement in unison to thus cause movement of said welding electrode means and said cooling and shaping means together relative to the article to deposit weld metal on the article and to cool and shape the weld metal deposited on said article.

44 Claims, 26 Drawing Figures

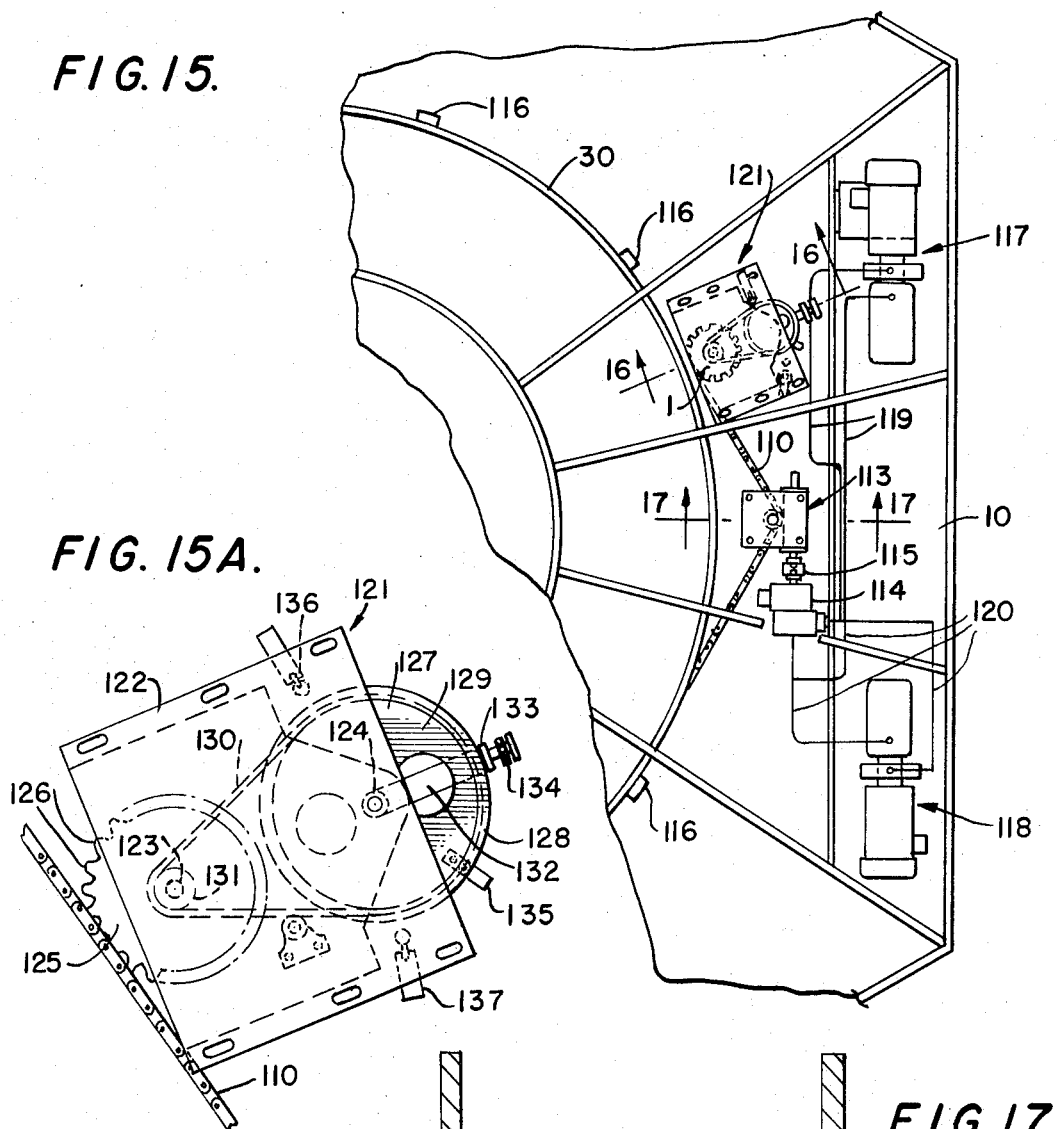
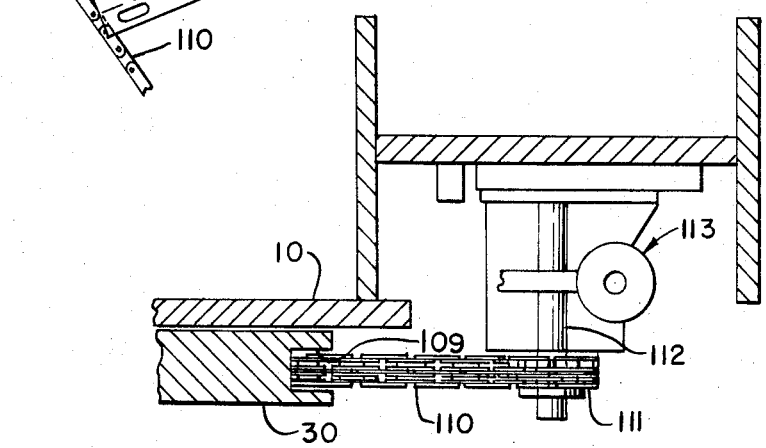
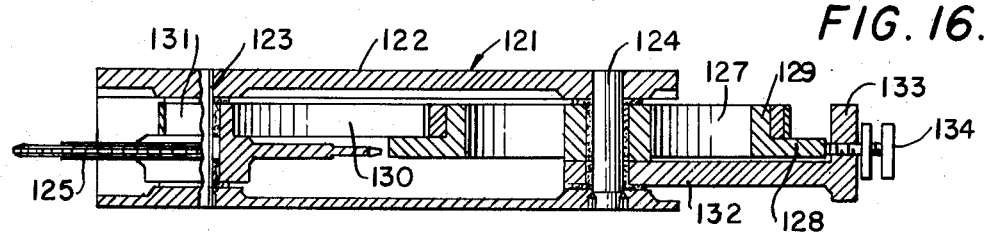

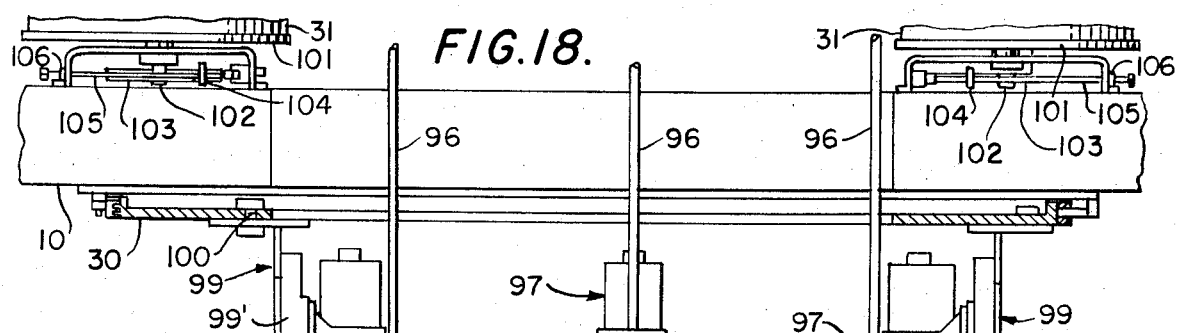
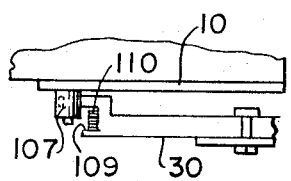
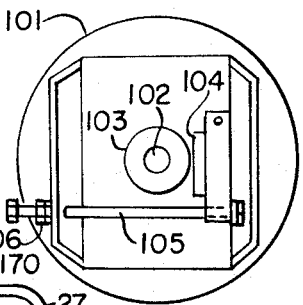
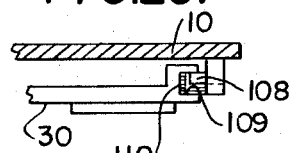
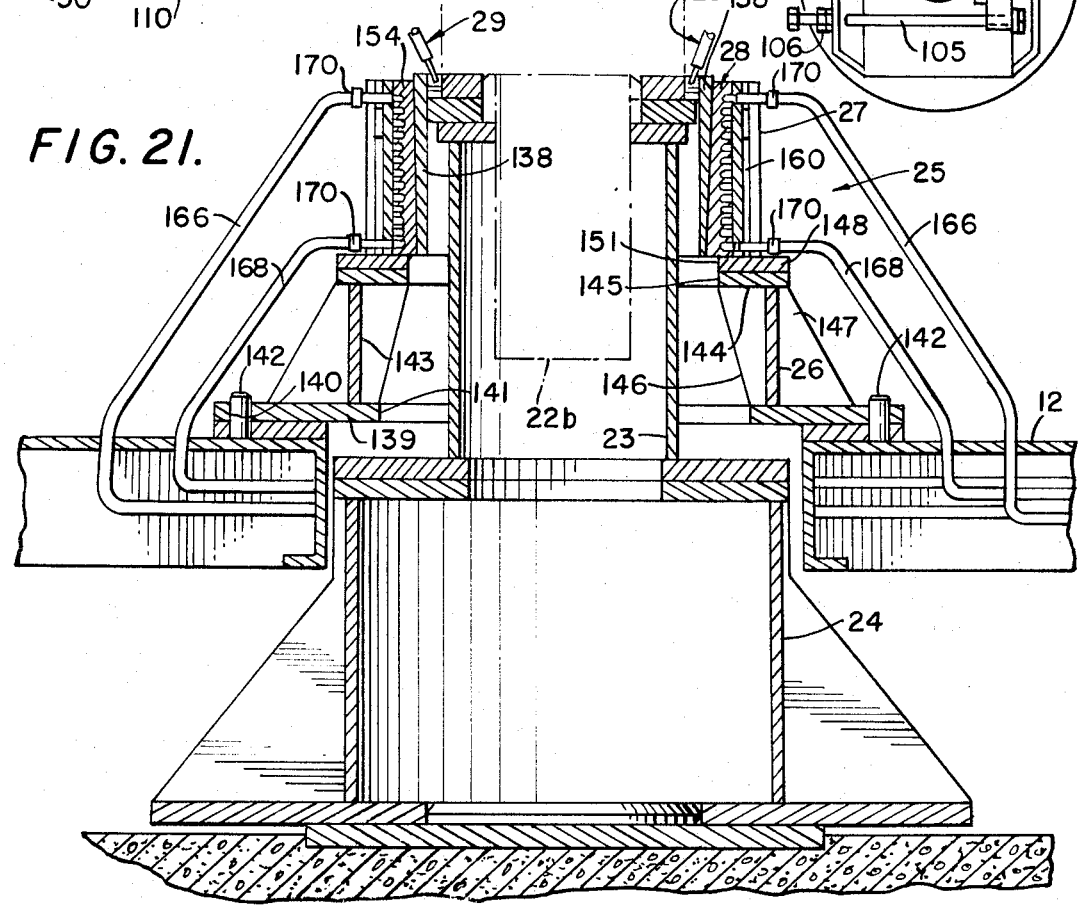

ELECTROSLAG WELDING MACHINE

BACKGROUND OF THE INVENTION

This invention relates to an electroslag welding machine or apparatus and, in particular, to an electroslag welding machine for depositing or casting weld metal onto articles such as steel mill rolls and the like in order to resurface such articles.

A portion or all of the surface of large, solid, cylindrically shaped rollers used in steel mills and the like wears away after repeated use of the rollers and the rollers accordingly must frequently be resurfaced or discarded. Conventional practice is to grind away approximately one-half inch or the like of the surface of such rollers and then to place a coating of weld metal thereon. The coating of weld metal must then be dressed or finished in order to produce a steel mill roll having a suitable exterior surface configuration. This process as practiced in the prior art is wasteful and is costly and time consuming.

The present invention provides an electroslag welding resurfacing machine for resurfacing steel mill rolls regardless of the size, length or material of the rolls. Further, the electroslag welding resurfacing machine of the present invention can be used for resurfacing various other articles, such as hollow tubes, or gear teeth or the like, and can even be used to cast heavy wall tubing of any type material which lends itself to the electroslag welding process.

In accordance with the present invention, an electroslag welding resurfacing machine is provided, including a plurality of vertically extending columns arranged in supporting relationship with a roof platform secured to the top thereof. Support means is provided in the frame means for supporting a large steel mill roll or the like therein on the base of the frame and at least two vertically spaced platforms are arranged to be moved along the support columns and relative to the roll. One of the platforms carries a plurality of electrode means and the other platform carries a cooling and shaping means or mold disposed in close, surrounding relationship to the roll. The electrode means extend into the space between the cooling and shaping means and the roll for depositing weld metal into the space and onto the roll, and the electrode means are caused to oscillate back and forth across the surface of the roll as they are moved therealong to insure even heat distribution and to maintain uniform penetration of weld metal into the roll. Drive means is supported on the frame means for raising and lowering the platforms and thus the welding means and cooling and shaping means relative to the roll to deposit weld metal onto the roll and to cool and shape the weld metal. The weld metal may be deposited on one side or several sides, or completely around the roll, or several different materials may be cast or deposited on the roll at different locations therearound.

The machine of the present invention includes a holding and centering device which engages the steel mill roll or other article and holds it in properly located and centered relationship in the machine. The holding and centering device is adjustable to accommodate steel mill rolls or other articles of widely varing sizes and shapes and may be either pneumatically, hydraulically or manually powered.

A steel mill roll or other article resurfaced in accordance with the present invention needs only a minimum of shaping or machining after deposition of metal thereon to provide a desired exterior configuration, and other articles, depending on how exacting the requirements are, may need no machining. Accordingly, a steel mill roll resurfaced in accordance with the invention is ready for use when removed from the machine except for minor touching up of some portions of the surface thereof. For example, a starting tab or plate is provided at one end of the roll for beginning the molten pool of weld metal, and a finishing tab or plate is provided at the other end of the roll for enabling the molten pool of weld metal to extend slightly above the top of the roll or other work, and these starting and finishing tabs are removed subsequent to the resurfacing operation.

With the electroslag welding machine of the present invention, large steel mill rolls or other articles are quickly and easily resurfaced with a layer of weld metal and only a minimum number of operations are required to be performed on the steel mill roll or other article in order to provide a smooth, properly configured exterior surface of the roll or other article.

OBJECTS OF THE INVENTION

An object of this invention is to provide an electroslag welding machine for resurfacing articles such as steel mill rolls or the like, wherein a layer of weld metal is deposited or cast onto the article by the electroslag welding method, and wherein the machine is designed to accommodate rolls or other articles of various different sizes and materials.

Another object of the invention is to provide an electroslag welding resurfacing machine for resurfacing workpieces such as large steel mill rolls and the like, wherein a water cooled mold means is positioned adjacent the workpiece, said mold means having nonlinear water passage means therein extending from the top to the bottom thereof to effect circulation of cooling water from the top of a molten pool of weld metal to the bottom thereof in a circular or non-linear path to thus achieve greater heat transfer while using less water than conventional machines.

A further object of the invention is to provide an oscillating means carried on an electroslag welding machine for oscillating a plurality of electrodes mounted to the oscillating means so that the electrodes are caused to move along a predetermined area of an article to deposit a layer of weld metal thereon.

A still further object of the invention is to provide an electroslag welding machine having a cooling and shaping means or mold positioned adjacent an article to be resurfaced, said cooling and shaping means having a water passage means therein and a plurality of inlets in the top thereof and a plurality of outlets at the bottom thereof to effect a circulation of water from the top to the bottom of the cooling and shaping means through the plurality of passage means to cool and shape weld metal deposited on said article.

BRIEF DESCRIPTION OF THE DRAWINGS

FIG. 14 is a view in elevation of a modified top centering and support means and showing an enlarged roll engaging adapter or chuck on one end thereof for engaging and supporting a relatively large roll or the like.

FIG. 15 is a fragmentary view of the underside of a portion of the upper platform showing the drive means and control means for oscillating the welding means of the invention.

FIG. 15A is an enlarged view of the control means for controlling the oscillation of the welding means.

FIG. 16 is an enlarged sectional view of the control means and is taken along line 16—16 in FIG. 15.

FIG. 17 is an enlarged sectional view of a portion of the drive means for driving the oscillating means and is taken along line 17—17 in FIG. 15.

FIG. 18 is an enlarged sectional view in elevation of a portion of the upper platform of the machine and showing the oscillating means and welding means supported thereon in operative position relative to a steel mill roll or the like to be resurfaced.

FIG. 18A is a plan view of the turntable means on which the welding material supply containers are mounted.

FIG. 19 is an enlarged fragmentary view in section of a portion of the oscillating means and of a positioning roller engaged with the outer periphery thereof.

FIG. 20 is an enlarged fragmentary sectional view of a portion of the oscillating means and showing a support roller engaged therewith.

FIG. 21 is an enlarged sectional view of a portion of the base of the machine and the lower platform and showing the support brackets and cooling and shaping means positioned relative to the platform and a roll supported thereon, the roll having a different roll journal than shown in FIG. 3, and the cooling and shaping means shown at the beginning of the operation.

DETAILED DESCRIPTION OF THE INVENTION

Figure 1:
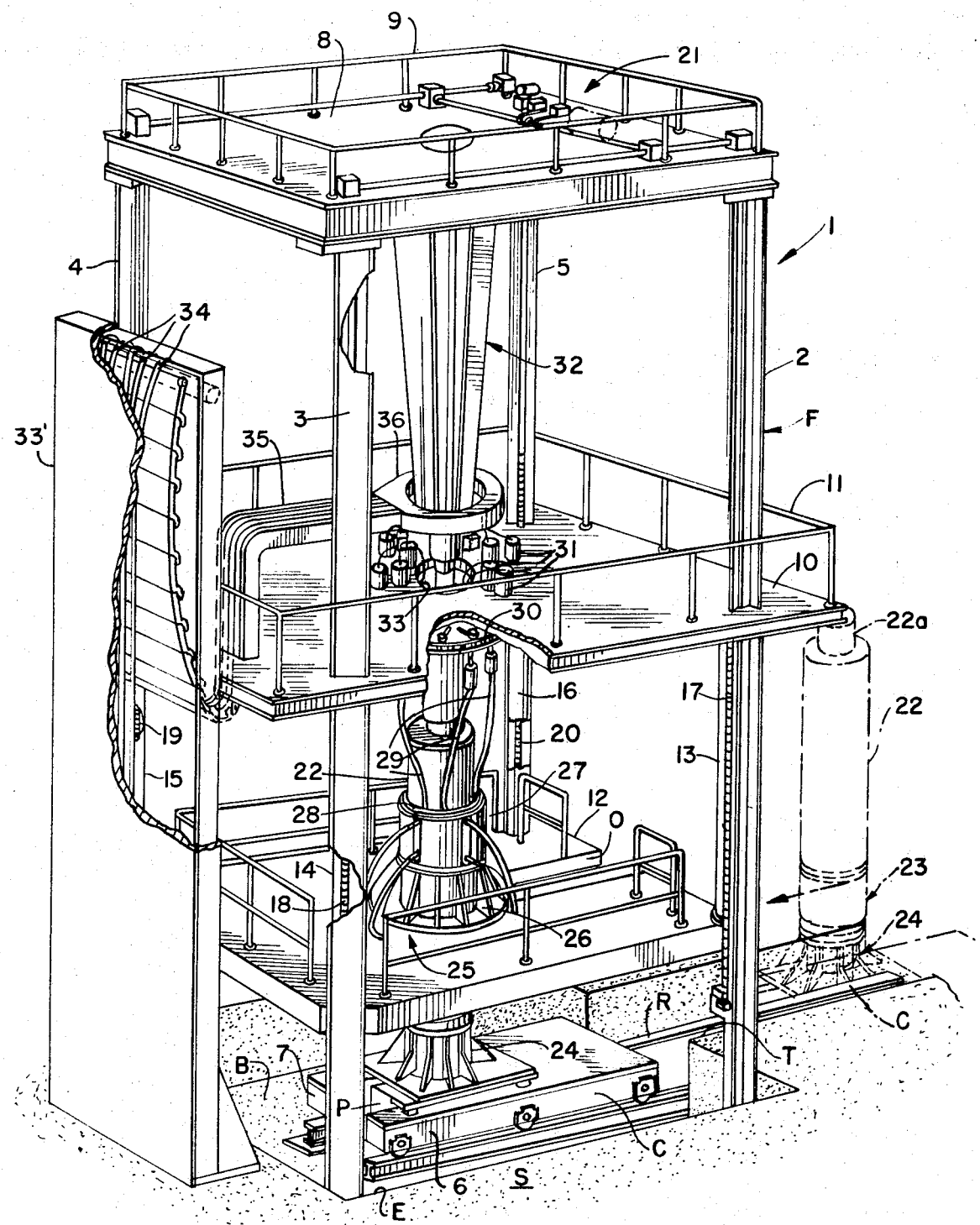
FIG. 1 is a top perspective view of an electroslag welding machine in accordance with the invention.
Figure 2:
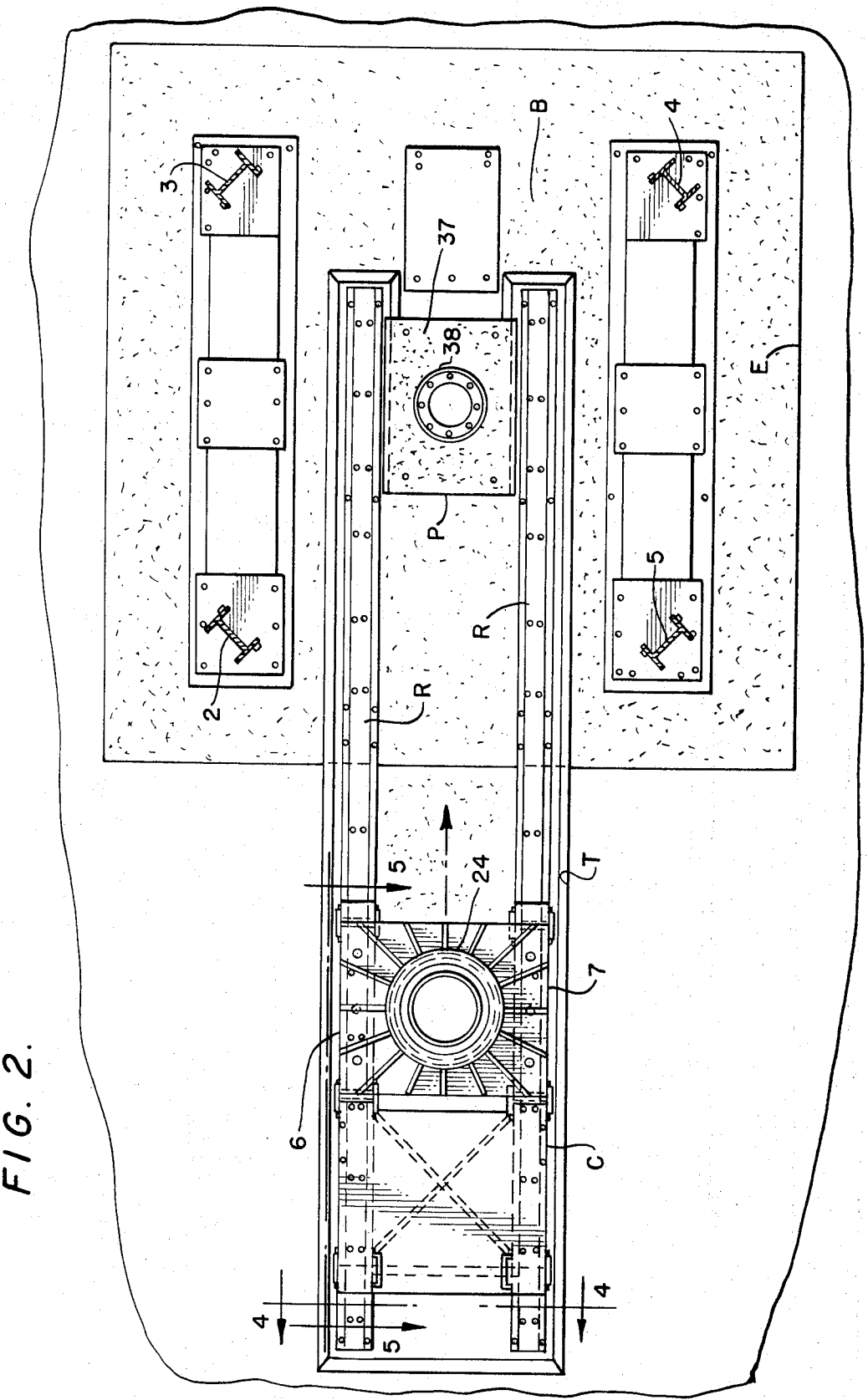
FIG. 2 is a sectional view of the machine of FIG. 1 looking down on the base thereof and showing the tracks leading to the base with a car thereon for transporting a roll or other article onto the base of the machine.
Figure 3:
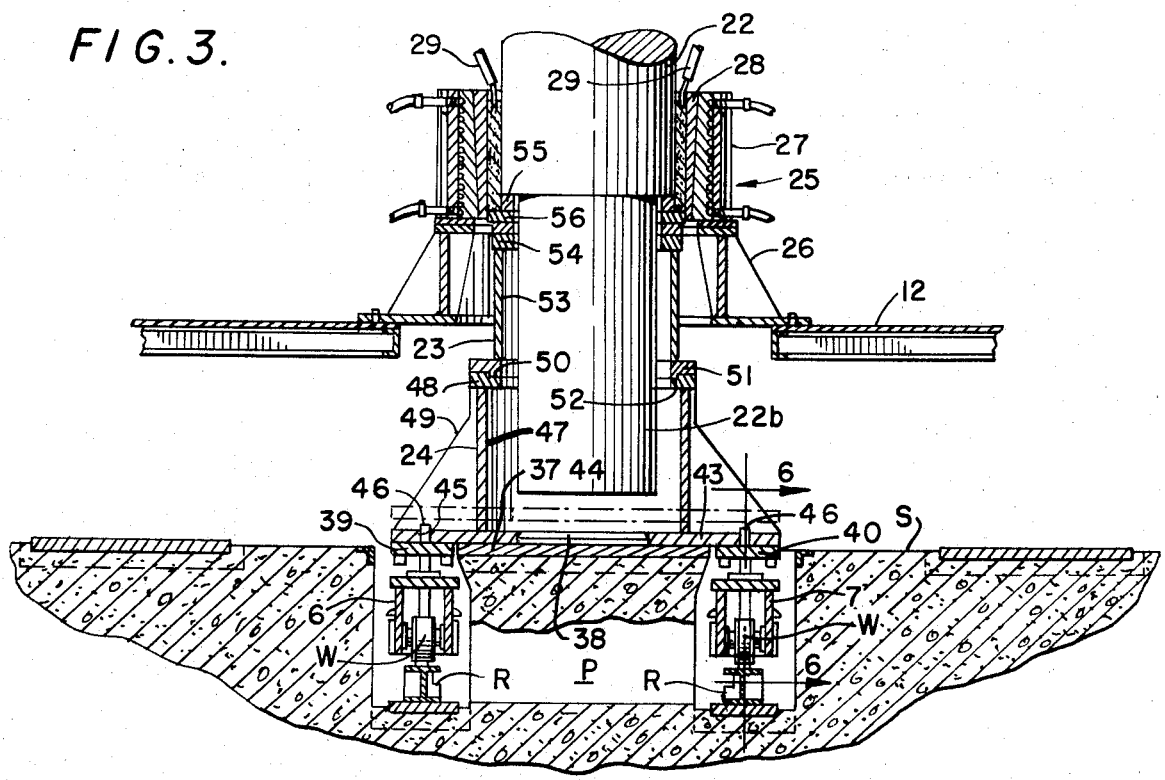
FIG. 3 is an enlarged vertical sectional view of the base of the machine, a portion of the lower platform, and the support brackets for supporting a steel mill roll or the like, and a cooling and shaping means positioned in operative relationship with the lower end of the roll or the like, with the cooling and shaping means advanced part way up the roll.
Figure 4:
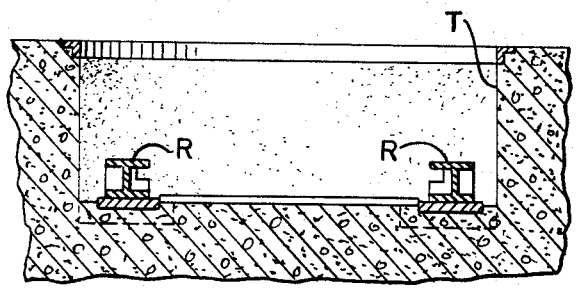
FIG. 4 is a sectional view taken along line 4—4 in FIG. 2.
Figure 6:
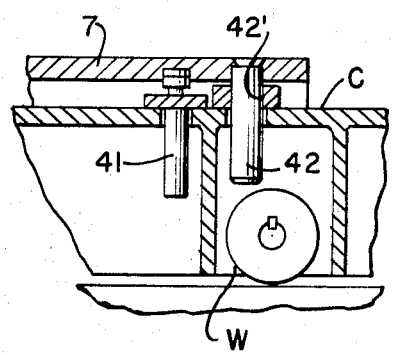
FIG. 6 is a greatly enlarged fragmentary sectional view of a portion of the car and means for elevating the roll and is taken along line 6—6 in FIG. 3.
Figure 5:
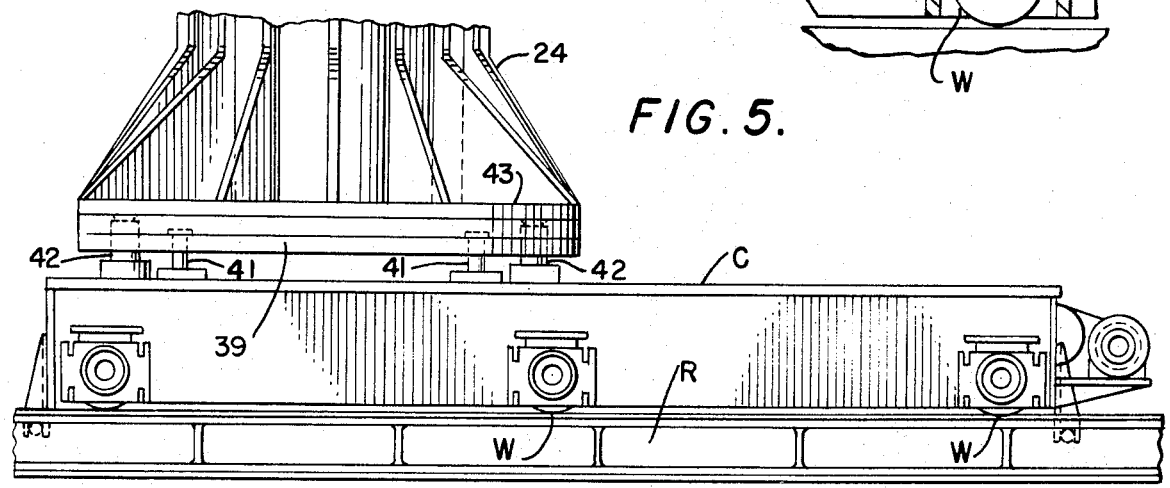
FIG. 5 is an enlarged fragmentary view in elevation of the car and a portion of the roll support means thereon and is taken along line 5—5 in FIG. 2.

An electroslag welding resurfacing machine is indicated generally at 1 in FIG. 1 and comprises a frame F including four vertically extending, spaced apart support columns 2, 3, 4 and 5, preferably formed of H-section beams or the like. The support columns are secured at their lower ends on a base B in an excavation or depression E in a floor or supporting surface S, and a channel or trench T opens through one side of the depression E. A pair of spaced apart tracks or rails R are secured in the bottom of the trench T for supporting a wheeled vehicle or car C thereon for movement therealong. An upstanding centering fixture or pedestal P is in the center of the base B between the ends of the rails R, and the car C has a pair of spaced apart, parallel, forwardly extending side portions 6 and 7 which extend on opposite sides of the pedestal P when the car C is positioned in the recess E.

A rectangular roof platform 8 is secured on the upper ends of the support columns 2, 3, 4 and 5 and has a handrail 9 thereon about the edge thereof. A rectangularly shaped upper platform 10 is mounted on the frame F with the columns 2, 3, 4 and 5 slidably extended through the corner portions thereof. The upper platform 10 also has a handrail 11 thereon to prevent a workman or machine operator or the like from falling from the platform 10.

A similar but smaller rectangularly shaped lower platform 12 is also mounted on the frame F for vertical movement along the support columns 2, 3, 4 and 5 and is held in predetermined vertically spaced relationship relative to the upper platform 10 by means of a plurality of vertically extending spacer columns 13, 14, 15 and 16 removably secured at their opposite ends to the upper and lower platforms so that the upper and lower platforms move in unison.

A plurality of elongate, vertically extending screw threaded lifting rods or screws 17, 18, 19 and 20 extend in closely spaced parallel relationship with the support columns 2, 3, 4 and 5 and are suitably threadably connected to the upper platform 10 for lifting the upper platform and thus the lower platform 12, which is connected to the upper platform by means of the spacer columns 13, 14, 15 and 16. The lifting rods 17, 18, 19 and 20 are attached at their upper ends to the roof 8 adjacent the corners thereof and are connected through suitable gearing and the like with a suitable drive means 21 on the roof 8. The drive means for lifting the platforms 10 and 12 could equally as well be provided in the base of the machine, if desired.

An article or workpiece to be resurfaced, such as a large, solid steel mill roll 22 or the like having journals 22a and 22b on the opposite ends thereof is supported on one end thereof with its longitudinal axis vertically disposed. The roll 22 is shown in phantom lines in FIG. 1 about to be positioned in the machine and is supported on a roll support adaptor sleeve 23 which is in turn supported on a roll support bracket 24.

In full lines in FIG. 1, the roll 22 is shown in supported relationship on top of the pedestal P in approximately centered relationship in the machine. An entry slot or opening O is formed through one side of the platform 12 to enable movement of the roll 22 therethrough for positioning of the roll on the pedestal P.

A water cooled mold means 25 for cooling and shaping weld metal deposited on the roll 22 is supported on top of the lower platform 12 and is positioned in surrounding relationship to the roll 22. The mold means 25 comprises a cooling ring bracket support 26 and a cooling ring holder bracket 27 within which a water cooled cooling ring 28 is mounted.

A plurality of welding means 29 extend at their lower ends into the space between the cooling ring 28 and roll 22 and are attached at their upper ends to a unique and novel oscillating plate 30 attached to the underside of upper platform 10, and a plurality of supply means or containers 31 for welding wires or bars or other welding material, are mounted on the top of the upper platform 10.

An upper roll support and centering means 32 is secured to the roof 8 and extends vertically downwardly therefrom through an opening 33 in the center of the upper platform 10 and into supporting engagement with the upper end of the roll 22 for holding the roll in centered relationship within the machine.

A power supply guide mans 33' is positioned adjacent one side of the machine 1 for holding and guiding a plurality of power supply cables 34 which extend from a suitable source of electricity or hydraulic or pneumatic power over the guide 33' and over a guide 35 on the machine to a suitable distribution means 36 on the machine.

Further details of construction of the components of the electroslag welding machine are illustrated in FIGS. 3 through 24.

The tracks or rails R in the trench T and recess E are of conventional design and preferably are similar or identical to railroad tracks or rails, and the base B, recess E, trench T and pedestal P are all preferably constructed of concrete or the like and may be suitably reinforced if desired.

The pedestal P is preferably rectangular in cross-sectional configuration, although it may have any other desired configuration, and a substantially flat, rectangular steel plate 37 is affixed to the top of the pedestal P. A circular, raised locating or centering boss 38 is secured in the middle of the plate 37 on top of the pedestal P for accurately locating a roll and its supporting structure on the pedestal.

The car C may be self-propelled, manually gear driven or manually propelled, as desired, and includes a plurality of wheels W positioned to roll along the tops of the rails R. The forwardly extending side portions 6 and 7 include vertically movable elongate lifts 39 and 40, respectively, arranged to be raised and lowered relative to the side portions 6 and 7 by suitable lifting means 41 operatively associated therewith and with a suitable motive power means, not shown, in the car C. Guide pin and bushing means 42 and 42' are also operatively associated with the lifts 39 and 40 for guiding the lifts and maintaining them in proper position during up and down movement thereof.

The roll support bracket 24 for the steel mill roll 22 or the like has an enlarged rectangular base plate 43 with an opening 44 in the center thereof of approximately the same size as the centering boss 38 on top of the pedestal P. A plurality of openings 45 are formed through the base 43 adjacent the corners thereof for cooperating with a plurality of pins 46 on the lifts 39 and 40 of the car to prevent the roll support and roll from sliding on the car during handling thereof and to properly locate the roll and support bracket therefor on the car so that the support bracket and roll are accurately positioned for placement on top of the pedestal.

The roll support bracket also includes a cylindrical, upstanding support cylinder 47 welded or otherwise suitably secured at its lower end to the base 43 slightly outwardly of the opening 44 therein and has an annular support ring 48 suitably secured as by welding or the like to the upper end thereof. A plurality of radially extending reinforcing flutes or webs 49 are secured to the base 43 and support cylinder 47 for reinforcing the roll support bracket. The annular ring 48 at the top of the roll support bracket has an annular notch or recess 50 at the upper inner marginal edge thereof.

The adapter sleeve 23 has a similar annular ring 51 with downwardly directed lip or flange 52 therein received in the notch 50 on the roll support bracket 24. The ring 51 is welded or otherwise suitably secured to the lower end of a spacing sleeve or cylinder 53, selected to correspond to the size and shape of a particular roll to be supported thereon. The spacing cylinder has an annular support ring 54 welded or otherwise suitably secured to the upper end thereof.

A starting ring 55 is welded to the underside of the end of the roll 22 substantially flush with the outer surface of the roll and a starting plate 56 is welded or otherwise secured to the lower end of the starting ring 55 for cooperation with the mold means 25 to form a well for the molten puddle of weld metal which is formed in the space between the mold 25 and the roll 22. The starting plate 56 rests on top of the annular ring 54 and the cylinder or sleeve 53 which is in turn supported in proper aligned relationship on top of the roll support bracket 24. Accordingly, the boss 38 and opening 44 in the roll support bracket accurately align the roll support bracket on the pedestal P and the roll support bracket and cylinder 53 cooperate with the starting plate 56 and roll 22 to accurately center the roll 22 on the base of the machine.

Figure 7:
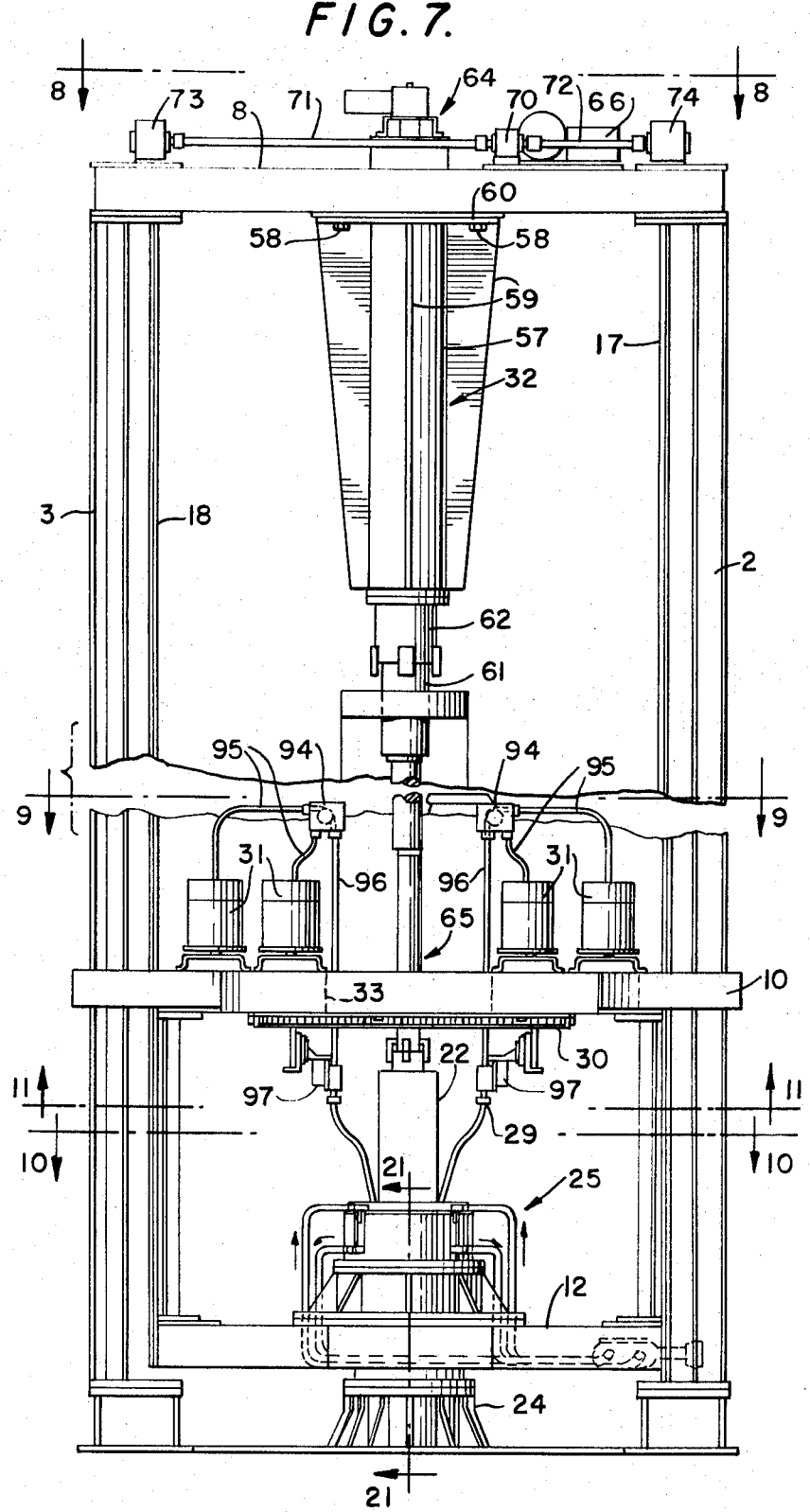
FIG. 7 is an enlarged view in elevation, with a portion thereof broken away, of a machine of FIG. 1.
Figure 8:
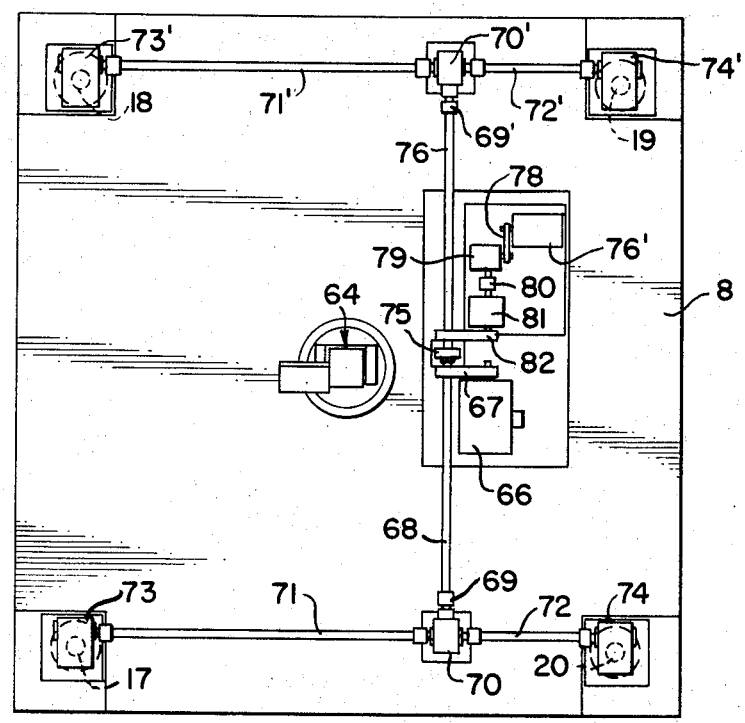
FIG. 8 is a top plan view of the machine taken along line 8—8 in FIG. 7.
Figure 9:
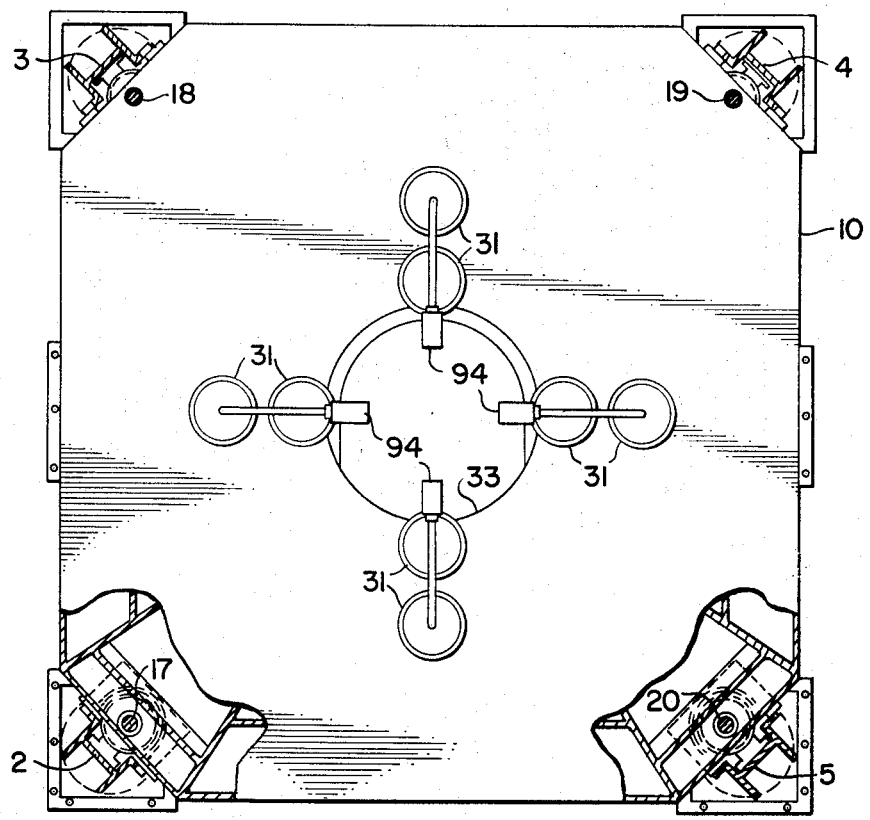
FIG. 9 is a vertical sectional view of the machine looking down on the top of the upper platform as is taken along line 9—9 in FIG. 7.
Figure 13:
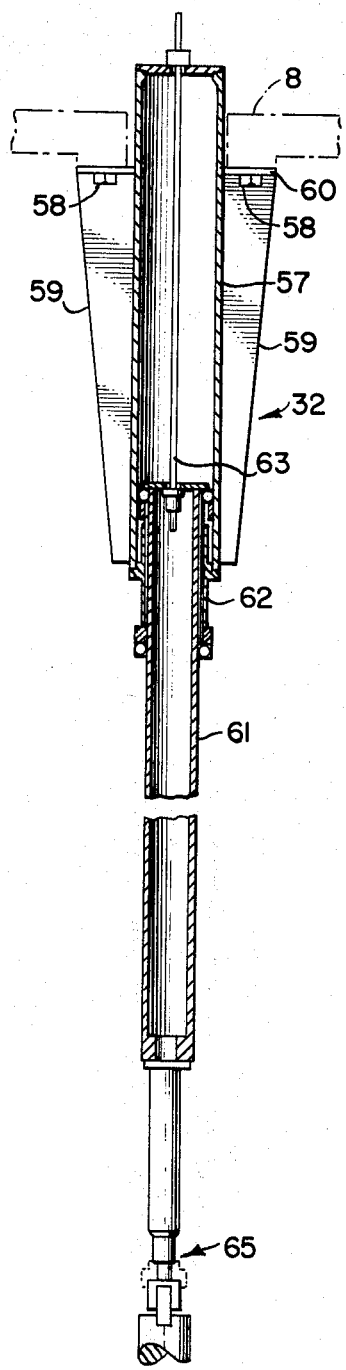
FIG. 13 is a vertical sectional view of the top centering and support means for engaging the upper end of a steel mill roll or the like positioned in the frame.
Figure 14:
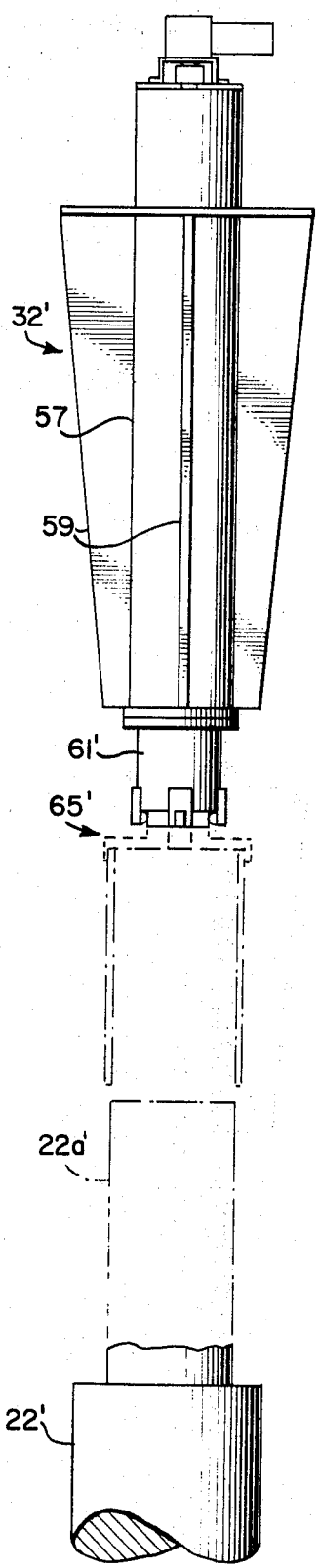
Figure 22:
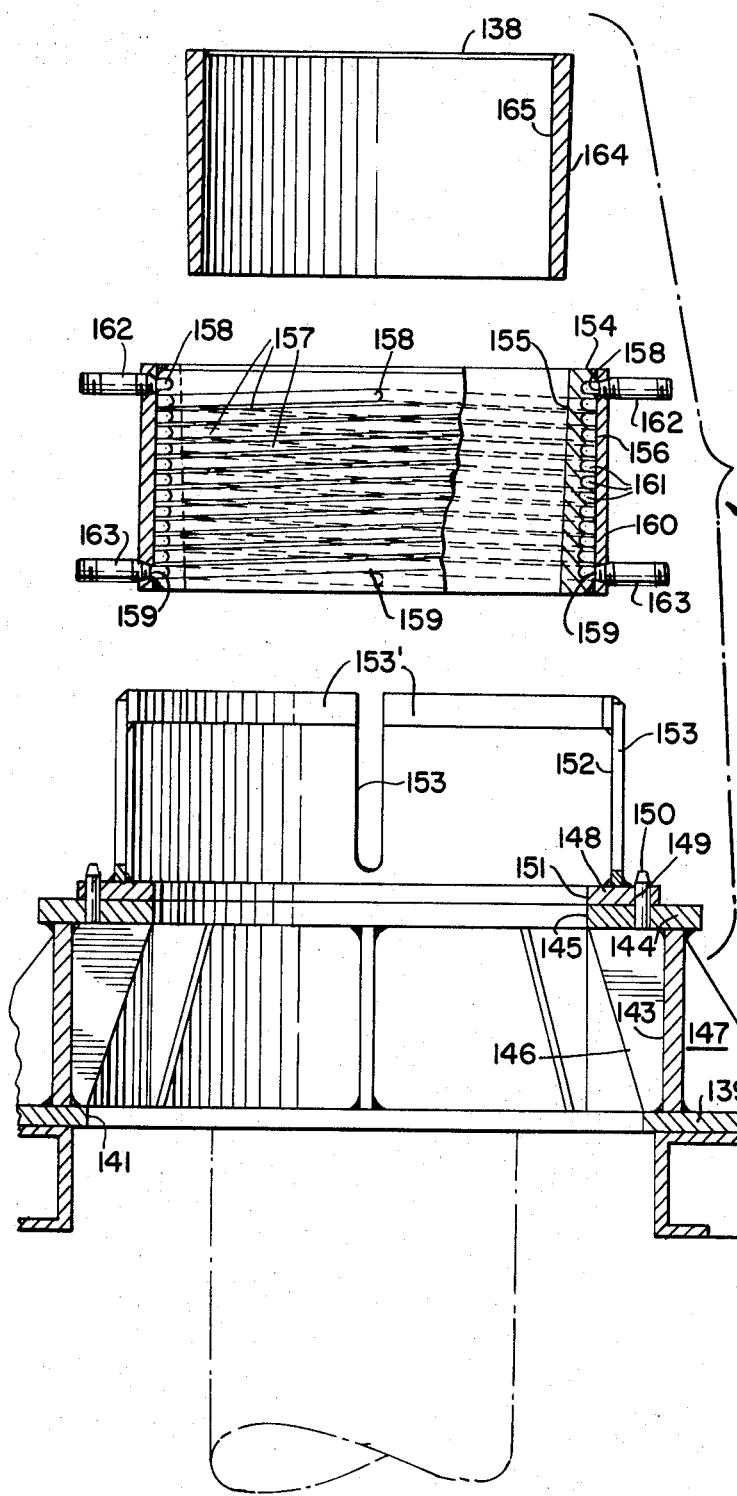
FIG. 22 is an enlarged exploded sectional view of the cooling and shaping means and the supporting brackets therefor in position on the lower platform.

The upper end of the roll 22 is engaged and supported in properly centered relationship by the upper support and centering means 32. As seen in FIGS. 7, 13 and 14, the upper support and centering means 32 comprises a vertically downwardly extending cylindrical housing 57 suitably secured at its upper end to the underside of roof 8 as by bolts 58 or the like which permit limited lateral adjustment of the support and centering means 32 relative to the frame for alignment purposes. The housing 57 of the support and centering means 32 is suitably reinforced by means of a plurality of webs or flanges 59 welded or otherwise suitably secured to the housing 57 and to an annular base plate 60 at the upper end of the housing 57. A telescoping extension 61 is slidably received in the housing 57 and projects vertically downwardly therefrom through a sleeve 62 in the lower end of housing 57. The telescopic extension 61 has a suitable drive rod 63 connected therewith and to a suitable drive means 64 on top of the roof such as a hydraulic, mechanical or pneumatic means, for effecting raising and lowering of the telescopic extension 61. A suitable adapter assembly such as a lathe welder chuck or the like 65 is secured to the lower end of the telescoping extension 61 for engaging and gripping the upper end of the roll 22 to hold the roll in accurately centered relationship within the machine. The adapter assembly 65 can be changed to accommodate different size rolls. For example, in FIG. 14, a slightly modified upper support and centering means 32' is illustrated and is substantially identical with the support and centering means 32 except that it has a larger roll engaging adapter assembly or chuck 65' at the lower end of the telescoping extension 61' for engaging and supporting a larger roll 22'.

The drive means for raising and lowering the upper and lower platforms 10 and 12 is seen best in FIGS. 7, 8, 9 and 12. The drive means may be of any suitable type, but preferably comprises an electric motor means connected with the lift rods or screws 17, 18, 19 and 20 through suitable gearing. In a preferred construction, a first motor 66 is secured on top of the roof 8 and is connected through a timing belt 67 with a suitable drive shaft 68 which is in turn connected through a first chain coupling 69 with a 1:1 right angle drive 70. A pair of deive shafts 71 and 72 extend in opposite directions from the right angle drive 70 and are connected to suitable cone drive, hollow shaft worm gears 73 and 74 at the corners of the roof 8. The worm gears 73 and 74 are suitably connected with the lift screws 17 and 20, and preferably have a drive ratio of 40:1. The motor 66 is also connected through a suitable coupling 75 with another drive shaft 76 and chain coupling 69', right angle drive 70' and drive shafts 71' and 72' with cone drive, hollow shaft worm gears 73' and 74' at the opposite side of the roof 8 and in operative connection with the lift screws 18 and 19 at the other side of the machine. The motor 66 is preferably a suitable electric motor rated at 20 horsepower and 1,750 rpm.

A second motor 76' is also connected with the drive shafts and worm gears for driving the platforms and is connected with the drive shafts through a timing belt 78, Winsmith single reduction reducer 79, chain coupling 80, a Warner base mounted electro module clutch assembly 81, and a timing belt 82 connecting the clutch assembly 81 with the drive shafts 68 and 76. The motor 76' is preferably a 3 horsepower electric motor rated at 1,750 rpm. The motor 66 is normally used for raising the platforms 10 and 12.

The lift screws 17, 18, 19 and 20 are all substantially identical in construction, and only lift screw 17 will be described, description of screw 17 sufficing for all.

Figure 12:
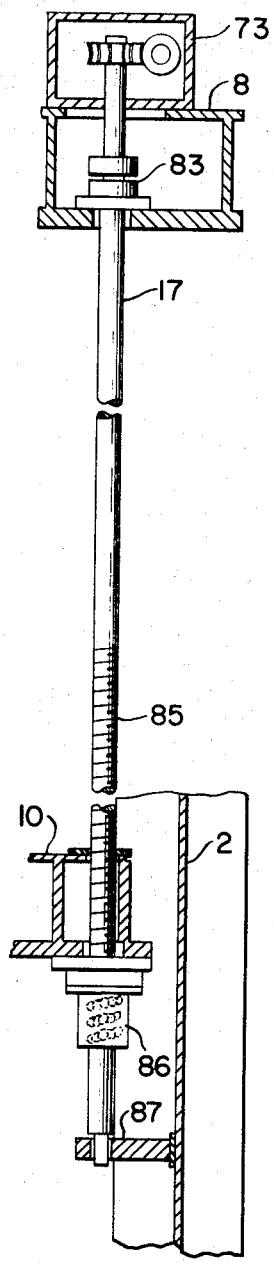
FIG. 12 is an enlarged sectional view, with a portion thereof broken away, of one of the lift screws for lifting the platform and showing its manner of connection with the roof of the frame and with the upper or top platform.

As seen in FIG. 12, the upper end of the lift screw 17 extends upwardly through the roof 8 and is attached to the roof 8 by means of a taper roller thrust bearing 83. The cone drive hollow shaft worm gear 73 is operatively connected with the upper end of the lift screw 17 which projects above the upper surface of the roof 8, and the lower portion of the lift screw 17 is threaded at 85 and extends through the upper platform 10 and through a Saginaw ball screw nut 86 secured to the underside of the top platform 10. The lower end of lift screw 17 is received in a pedestal bearing 87 secured to the support column 2 for preventing deflection thereof during operation of the lift means.

As noted previously, the lower platform 12 is connected with the upper platform 10 for movement therewith by means of a plurality of substantially identical vertically extending spacer columns 13, 14, 15 and 16 removably secured at their opposite ends to the upper and lower platforms, respectively, adjacent the corners thereof. As seen best in FIGS. 10, 23 and 24, these spacer columns are semi-cylindrical in design and also serve to shield and protect the lift screws 17, 18, 19 and 20 during operation of the machine. The lower end of each of the spacer columns 13, 14, 15 and 16 is provided with a quick disconnect coupling to the lower platform 12 so that the spacer columns may be quickly and easily disconnected from the lower platform 12 to permit independent raising and lowering of the upper platform 10 to provide additional space between the platforms.

Figure 23:
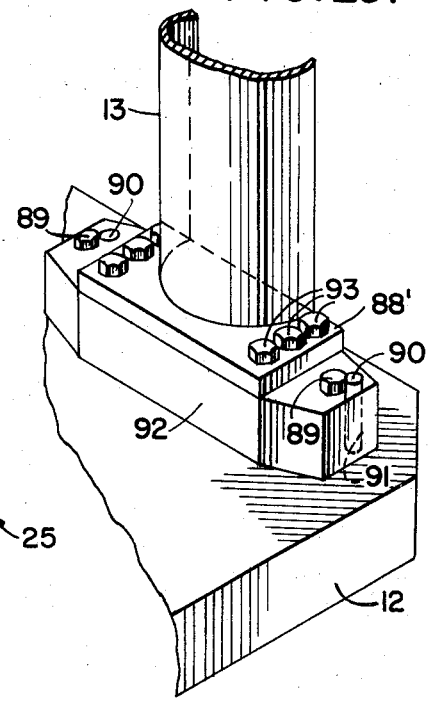
FIG. 23 is an enlarged fragmentary perspective view of the quick disconnect connection between the spacing columns and platforms.

As seen in FIG. 23, the quick disconnect coupling means on spacer column 13, and on each of the other spacer columns, comprises a rectangular plate or flange 88 welded or otherwise suitably secured to the lower end of the spacer column, and the plate 88 and column 13 are secured to the platform 12 by means of hex head cap screws or bolts 89 or the like extended through opposite ends thereof and into the platform. The spacer columns are properly aligned relative to the platform by means of guide pins or dowels 90 securd to the platform and extended through openings 91 in the plate 88.

Figure 24:
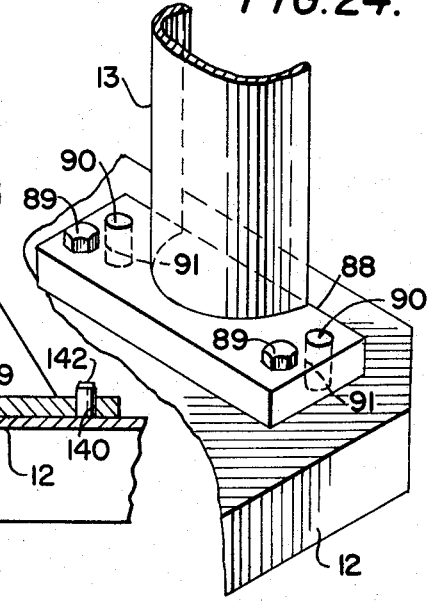
FIG. 24 is a view similar to FIG. 23 of a modified quick disconnect connection.

A slightly modified quick disconnect or coupling means is illustrated in FIG. 24, and is similar to the coupling means illustrated in FIG. 23, except that a relatively thick spacer block 92 is interposed between the plate or flange 88' and the platform 12. The plate 88' is secured to the spacing block 92 by means of a plurality of hex head screws or bolts 93 or the like extended through opposite ends of the plate 88' into the spacing block 92. The spacing block 92 is secured to the platform 12 by means of hex head screws or bolts 89 or the like and is suitably aligned relative thereto by means of pins or dowels 90 and openings 91.

The relationship of the welding means 29 with the upper platform 10 and of the cooling and shaping means or mold 25 with the lower platform 12 is seen best in FIGS. 7, 18, 19, 20 and 21.

The welding means is seen particularly in FIGS. 7, 9, 11 and 18 and comprises a plurality of welding wire guides 94 such as pulleys or the like secured to the upper platform 10 in upwardly spaced relationship to the upper surface thereof and over which the welding wire or material 95 is moved as it is withdrawn from the containers 31 to prevent crimping of the wires. After passing through the guides 94, the welding wire is fed downwardly through rubber covered coil spring wire guides 96 which extend vertically downwardly from the guides 94 through the upper platform 10 to a plurality of welding heads or wire feeders 97, preferably of the LINDE EH-1 type, which are adjustably mounted to the oscillator ring 30 on the lower side of the upper platform 10 for feeding the welding wire 95 downwardly through elongate, tubular electrode guides 98 and into the space between the mold 25 and the roll 22. Any desired number of electrodes, wire feeders and welding wire containers may be provided on the upper platform, but in a preferred embodiment, 27 electrodes and associated structures are provided. The wire feeders 97 are mounted to the oscillating ring 30 for movement relative thereto in both vertical and lateral directions by means of bracket assemblies 99 which are secured in a plurality of radially extending slots 100 in the oscillating ring. Each bracket assembly 99 is adjusted longitudinally of the slots 100 to effect lateral adjustment of the welding heads or wire feeders 97 to accommodate different size rolls. The welding heads can also be adjusted vertically by means of a vertically adjustable slide 99' of the bracket assembly 99.

The containers 31 are mounted on rotatable tables 101 which are secured on the upper end of a shaft 102. A brake wheel 103 is secured to the lower end of shaft 102, and a brake block or pad 104 is engaged with wheel 103 for retarding rotation of the table 101. An adjustment rod 105 is connected with the brake shoe 104 for urging it against the brake wheel 103 with a desired, preselected pressure. Locknuts 106 are threaded on the rod 105 to lock it in desired adjusted position.

Referring particularly to FIGS. 18, 19 and 20, the oscillator ring 30 is secured to the underside of platform 10 by means of a plurality of alignment guide rollers 107 attached to the underside of the platform and in engagement with the outer periphery of the ring 30 to maintain the position of the ring 30. A plurality of support rollers 108 are secured to the underside of the platform 10 and are engaged in supporting relationship within a U-shaped channel 109 formed in the outer peripheral edge of the ring 30. The oscillator ring 30 and the associated welding means are caused to oscillate by means of a chain 110 disposed in the U-shaped channel 109 around the oscillator ring and around a sprocket 111 fixed on the lower end of a vertical shaft 112 which is driven through a worm gear reducer arrangement 113 from a suitable motor 114 secured to the underside of the platform 10.

As seen in FIG. 15, the motor 114 preferably comprises a dual vane hydraulic motor and is coupled to the worm gear reducer 113 through a Morse chain coupling 115. The chain 110 is of the double roller type and is tacked or affixed to the oscillator ring 30 by means of clamps or the like 116 secured to the ring 30 at spaced intervals around the circumference thereof. The dual vane hydraulic motor 114 may be of any type, but is preferably a Parker Hennifin dual vane model producing 10 inch pounds of torque at 100 psi. The motor 114 is operated through a fail safe arrangement including a pair of Parker Hennifin PUTM-8 power units 117 and 118 connected with the motor 114 by suitable conduit mean 119 and 120, and each consisting of a one gallon tank, a double solenoid three-position valve, a model D-14 gear pump, and a 1½ horsepower, 1,725 rpm motor.

The amplitude of oscillation of the oscillating ring 30 and associated welding equipment is controlled by an oscillating control means 121 mounted to the underside of the platform 10 and disposed in operative relationship with the chain 110 and power units 117 and 118 for effecting reversing of the motor 114 and the oscillator ring 30 and associated welding equipment. As seen in FIG. 15, 15a and 16, the oscillating control means 121 comprises a housing 122 having a pair of spindles or axles 123 and 124 mounted therein adjacent the opposite sides thereof. A sprocket wheel 125 is mounted for rotation on the axle 123 and has a plurality of teeth 126 on the periphery thereof disposed in operative engagement with chain 110 so that movement of the chain causes movement of the wheel 125. A second wheel 127 is mounted on axle 124 for rotation relative thereto and has an enlarged diameter lower portion 128 and a reduced diameter upper portion or hub 129. A suitable means such as a belt 130 or the like is positioned around an upstanding hub portion 131 on the sprocket wheel 125 and the hub 129 of wheel 127 so that the wheel 127 is caused to rotate in synchronization with rotation of wheel 125. A radially extending arm 132 is also pivotally mounted at one end thereof around the shaft or axle 124 and extends beyond the periphery of the enlarged diameter portion 128 of wheel 127. The outer end of arm 132 has a vertically extending limit switch engaging finger or cam 133 thereon and an adjusting lock nut 134 is threaded through the upstanding finger 133 and into operative engagement with the outer surface of enlarged diameter portion 128 of wheel 127 so that the arm 132 and finger 133 may be locked in different adjustment angular positions relative to the wheel 127.

A second limit switch engaging cam or finger 135 is fixedly secured to the wheel 127 in angularly spaced relationship to limit switch engaging cam or finger 133, and the angular displacement between the two limit switch engaging cams or fingers is adjusted by means of the lock nut 134 and lever arm 132. The angular displacement between the limit switch engaging cams is normally selected so that the electrodes are caused to traverse a distance of approximately 4 to 8 inches on the surface of roll 22.

A pair of limit switches 136 and 137 are mounted on the housing 122 at opposite sides thereof and are arranged so that cam or finger 135 engages limit switch 137 and cam or finger 133 engages limit switch 136.

In operation, as the motor 114 causes the oscillator ring 30 to rotate, the chain 110 also engages wheel 125 and causes the wheel 125 to rotate, thus causing belt 130 to rotate wheel 127 and thus cause the limit switch engaging fingers or cams 133 and 135 to engage a respective limit switch, depending upon the direction of rotation. If the oscillating ring is caused to rotate initially in a clockwise direction by motor 114, the limit switch engaging finger 135 engages limit switch 137 after a predetermined angular displacement of the ring 30, and the motor 114 is caused to reverse its direction of operation to rotate the ring 30 in a counter clockwise direction. After a predetermined angular displacement in the counter clockwise direction, limit switch engaging finger or cam 133 engages limit switch 136 and effects reversal of the direction of operation of motor 114 to again cause rotation of the ring 30 in a clockwise direction. This cycle of operation repeats for a prdetermined period of time or numbr of operations as determined by a programmed control arrangement or by an operator or any suitable timing device associated therewith.

The mold means 25 for cooling and shaping the weld metal deposited on the roll 22 is illustrated in greatest detail in FIGS. 7, 10, 21 and 22. The mold means 25 includes the cooling ring support bracket 26, cooling ring holder bracket 27, cooling ring 28, and an insert 138. The cooling ring bracket support 26 includes an annular base or bottom plate 139 having a plurality of apertures or openings 140 therein adjacent the outer circumference thereof and a central opening 141 in the middle thereof. A plurality of dowels or locating pins 142 are suitably secured to the lower platform 12 and extend through the openings or apertures 140 in the plate 139 to accurately locate the cooling ring bracket support 26 relative to platform 12 and roll 22 supported in the machine. A support cylinder 143 is welded or otherwise suitably secured at its lower end to the base plate 139 and has a slightly larger diameter than the central opening 141 therethrough. An annular support ring 144 is welded or otherwise suitably secured to the upper end of support cylinder 143. The support ring 144 also has an opening 145 in the center thereof of larger diameter than the insert 138 but of smaller diameter than the opening 141 through base plate 139. A plurality of reinforcing webs 146 and 147 are welded to the inside and outside, respectively, of the support cylinder 143 and to the base plate 139 and support ring 144 to reinforce and rigidify the cooling ring bracket support 26.

The cooling ring holder bracket 27 is supported on top the support ring 144 of the cooling ring support bracket and includes an annular base ring or plate 148 having a plurality of apertures 149 therethrough adjacent the outer marginal edge thereof and through which are extended a plurality of locating posts or pins 150 secured to the plate 144 on the cooling ring support bracket to accurately align the cooling ring support bracket and cooling ring holder bracket. The plate 148 has a central opening 151 therethrough of substantially the same diameter as the opening 145 in the subadjacent plate 144 of the cooling ring support bracket, and an upstanding support cylinder 152 is welded at its lower end on top of the plate 148 intermediate the inner and outer marginal edges thereof. A plurality of vertically extending slots 153 are formed in the cylinder 152 extending from adjacent the lower edge therof through the upper edge thereof, and a plurality of annular ring segments 153' are welded to the inner upper marginal edge surface of the cylinder 152, with the upper edges thereof projecting slightly above the upper edge or end of cylinder 152. The segments correspond in length to the distance between adjacent slots 153.

The cooling and shaping ring or mold 28 comprises an inner cylinder 154 having a slightly inwardly and downwardly tapered inner surface 155 and a cylindrical outer surface 156 with a plurality of helical grooves or channels 157 formed therein extending from spaced inlet points 158 about the circumference at the top thereof to corresponding spaced outlet points 159 spaced about the circumference at the bottom thereof. An outer, enclosing ring or sleeve 160 of copper, steel, bronze or other material is welded or otherwise suitably secured to the outer surface of the cylinder 154 and encloses the grooves or channels 157 to form a plurality of separate water passage means 161 extending from the inlets 158 adjacent the top of the cooling and shaping ring 28 to the outlets 159 adjacent the bottom thereof. Each water passage 161 extends at least partially around the circumference of the ring 28, and preferably the water passages extend several times around the cooling ring from an inlet opening at the top thereof to an outlet opening at the bottom thereof. Thus, several separate helical coolant water passages are formed in the cooling and shaping ring extending from the top to the bottom thereof for circulation of coolant water from the top downwardly through the cooling ring and out near the bottom thereof. This arrangement of coolant passages results in cooling of the molten puddle of weld metal from the top to the bottom of the puddle and a much better heat transfer and much more effective cooling of the weld metal with even less coolant water is achieved than with conventional constructions.

A plurality of relatively short pipe fittings or nipples 162 and 163 are connected with the inlet and outlet openings 158 and 159, respectively, through the outer sleeve or ring 160 for connecting the coolant water passages 161 with a suitable source of water and a suitable sump or drain, respectively. When the mold means 25 is assembled, these pipe fittings or nipples 162 and 163 are received in the slots 153 in the cooling ring holder bracket cylinder 152.

The insert 138 has a tapered outer surface 164 corresponding in size and shape to the surface 155 on the inner cylinder or ring 154 of the cooling and shaping ring, and is adapted to engage the surface 154 to wedge the insert 138 and cooling ring together for movement vertically upwardly along a roll during a welding operation. The insert has a cylindrical inner surface 165 sized and shaped to provide the desired configuration to the weld metal deposited on the surface of a roll or other article. The insert serves to reduce the distance between the outer surface of the roll and the inner ring 154 and thus make the best possible use of the heat conductivity of the copper units. Different size inserts can be used for different size rolls or for different thicknesses of the coating deposited.

The cooling and shaping means or mold 28, including the insert 138, inner ring 154, and outer ring or sleeve 160, are all preferably formed of copper, and the inner and outer rings are welded together to insure against leaks. The insert 138 is also preferably made of copper.

Figure 10:
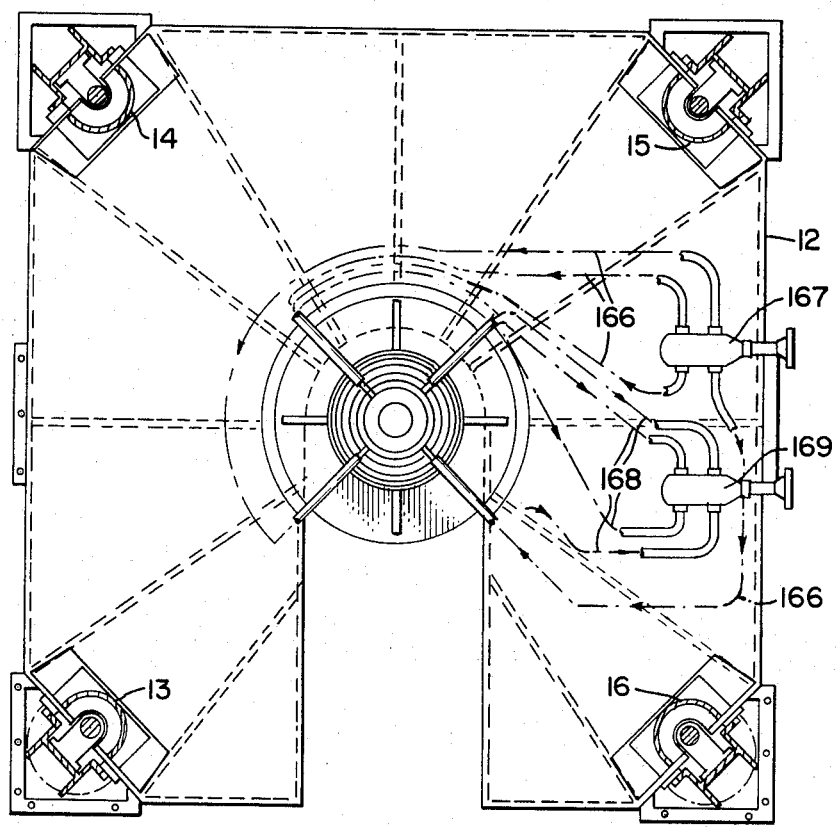
FIG. 10 is a vertical sectional view looking down on the top of the lower platform and is taken along line 10—10 in FIG. 7.
Figure 11:
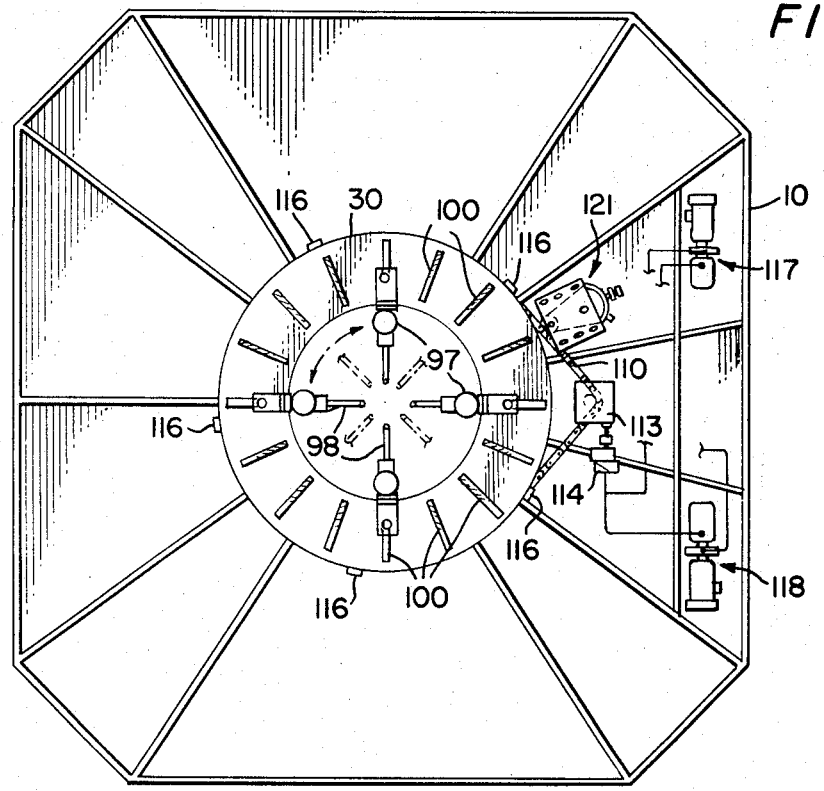
FIG. 11 is a vertical sectional view looking upwardly toward the underside of the upper platform and is taken along line 11—11 in FIG. 7.

As seen in FIGS. 10 and 21, a plurality of pipes or conduits 166 extend from an intake manifold or header means 167 located adjacent one edge of the platform 12 to the inlet pipe fittings or nipples 162 to conduct coolant water to the mold 25. Similarly, a plurality of conduits 168 extend from the outlet fittings or nipples 163 in the cooling ring to an outlet manifold or header 169 at the edge of the platform adjacent the inlet manifold or header 167 for conducting coolant water away from the mold. The conduits 166 and 168 are connected to the nipples 162 and 163 through suitable pipe couplings 170, preferably of the quick disconnect type.

In the use of the machine, one of the journal ends of a steel mill roll or other article to be resurfaced is placed on the roll support brackets, and the brackets and roll are positioned on the car C on the forwardly extending side portions thereof. The car C is then moved along the rails R by any suitable means into the electroslag welding machine. The platforms 10 and 12 are at this time in their raised or elevated position, and the roll passes through the slot or opening in the lower platform 12 to the center of the machine. The lift means on the forwardly extending side portions of the car are then elevated to lift or raise the roll or other article onto the centering fixture or pedestal on the base of the machine. The lifting means are then lowered so that the roll support brackets rest on the pedestal in centered relationship thereon. The car may then be left in position in the machine or it may be removed therefrom, as desired.

The mold means 25 is then positioned over the upper end of the roll and properly positioned or located on the lower platform 12 by means of the cooperating pins and apertures in the cooling ring support bracket and lower platform, respectively. The upper centering device is then lowered or extended through the central opening in the upper platform 10 into operative engagement with the upper end of the roll for accurately centering and holding the roll in position in the machine.

The conduits 166 and 168 are then connected with the nipples or fittings 162 and 163 in the mold means and the platforms are lowered along the roll until the mold means 25 is positioned adjacent the lower end thereof as seen in FIG. 21. The welding heads 97 are adjusted vertically until they are positioned in the area between the upper end of the insert 138 and the outer surface of the lower end of the roll 22. This area is initially filled with a suitable granular welding flux or the like and a suitable slag forming material or the like, and an arc is momentarily struck to melt the flux and the electrode to form a molten puddle approximately two inches deep. After the flux and slag forming material is melted, the arc is engulfed and current passes from the electrode to the parts through the conductive molten slag, and heat generated by the resistance to the flow of electrical current through the molten slag and the weld pool is effective to continue to melt the electrode and to fuse that portion of the parts in the welding area to the metal deposited from the electrode. The slag floating on top of the molten puddle shields the molten metal.

The drive means connected to the oscillator plate 30 and the electrodes is energized to cause oscillating movement of the electrodes around the circumference of the roll with a desired amplitude, usually on the order of 4 to 8 inches, to insure even heat distribution and uniform penetration of the weld. The drive means connected with the lift screws and the platforms is then energized to cause movement of the platforms and electrodes and mold means 25 upwardly along the roll as the electrodes melt. Circulation of coolant water through the mold means results in rapid cooling of the molten pool of weld metal, and the insert shapes or molds the weld metal as it is cooled and hardened to thus achieve a desired configuration of the weld metal on the outer surface of the roll.

The platforms are moved upwardly along the roll until the electrodes and mold means extend slightly upwardly beyond the upper end of the roll and the various drive means and electrodes and then de-energized to prevent further movement of the platforms or oscillator and further deposition of weld metal into the area between the cooling and shaping means and the surface of the roll. The upper centering device is than released and retracted from the upper end of the roll and the cooling the shaping ring is removed from around the roll. A car is then positioned beneath the roll support bracket and the lift means on the car raised to engage the roll support bracket for lifting the roll support bracket and roll from the pedestal. The car and roll are then removed from the machine.

The lower platform is slightly larger than the others and is designed to carry an operator's electrical controls and the like which are necessary for the operator to manipulate the various drive means and welding means, and also to carry whatever tools are necessary to perform the necessary operations on the machine during the use thereof.

The oscillator ring or plate and the mold means, brackets, and spacer columns between the platforms, or other components of the machine can be designed and manufactured in any size necessary to accommodate a customer's particular requirements. Normally, the machine is 35 to 40 feet high and the upper and lower platforms are spaced approximately 8 feet apart. The supply cables for supplying electrical, pneumatic or hydraulic power to the machine can be supported on a caterpillar track like arrangement to prevent pinching or kinking of the cables during raising and lowering of the platforms.

Further, although the invention has been described with reference to a cylindrical workpiece or article, other motions can be imparted to the welding heads as desired. For example, movement in the X and Y directions can be accomplished in place of rotation by change in design of the oscillating unit. For example, a variable speed oscillation can be accomplished through electrical motors and a hydraulic system or through a complete hydraulic, pneumatic or electrical system, wherein a gear drive or friction drive or other method of motion such as cam means or the like can be used to impart the desired motion to the oscillator plate and welding heads.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. An electroslag welding machine for depositing a layer of metal onto an article, comprising a base, a frame means supported on the base, an article support pedestal on the base for supporting an article thereon with the axis of the article vertically disposed, a fixed, roof platform secured on top of said frame means, a telescopic upper support secured on said roof platform and extending vertically downwardly therefrom into supporting engagement with the upper end of the article, a first, movable, upper platform supported on said frame means below said fixed roof platform for vertical movement relative to the frame means, welding means carried on said upper movable platform, said welding means disposed in close proximity to said article for depositing weld metal onto said article, a second, movable, lower platform supported on said frame means in vertically spaced relationship below said first movable platform, elongate spacer means releasably connected at opposite ends thereof to said upper and lower movable platforms releasably securing said platforms together in said vertically spaced relationship to permit vertical adjustment of the spacing between the platforms, cooling and shaping means carried on said lower movable platform, said cooling and shaping means disposed in closely spaced relationship to said article to define a space between the article and the cooling and shaping means, the welding means including welding electrode means extending into the space between the article and the cooling and shaping means, and drive means carried by the roof platform and connected to only said upper movable platform to cause vertical movement of said upper and lower movable platforms in unison to thus cause vertical movement of said welding electrode means and said cooling and shaping means together relative to the article to deposit weld metal on the article, and to cool and shape the weld metal deposited on said article.

2. An electroslag welding machine for depositing weld metal onto an article, comprising a base, frame means supported on said base, means on said base for supporting an article thereon, a vertically movable platform carried by the frame means, a welding electrode support means carried by the platform, said electrode support means including an annular oscillating ring supported on the underside of said platform for vertical movement therewith and oscillating movement relative thereto about a vertical axis, a radially extending annular flange on the peripheral marginal edge of said oscillating ring, a plurality of horizontal rollers secured to the underside of said platform and engaged with the underside of said flange to support said oscillating ring on the underside of said platform, a plurality of vertical rollers secured to the underside of said platform and engaged with the outer peripheral edge of said flange to maintain the position of said oscillating ring relative to the center of said platform, a flexible drive means operatively engaged in at least partially surrounding relationship with the peripheral marginal edge of said oscillating ring, reversible motor means operatively connected to said flexible drive means to impart movement thereto and thus to said ring, control means operatively connected with said reversible motor means to cause reverse operation of said motor means and thus said flexible drive means and oscillating ring in a second direction after a predetermined amplitude of operation thereof in a first direction, electrode support bracket means carried by said oscillating ring, welding electrode means supported by the electrode support bracket means for movement therewith, said welding electrode means disposed closely adjacent said article for both vertical and oscillating movement relative thereto as said platform is moved vertically and said ring is oscillated, to deposit weld metal on the article, and cooling and shaping means disposed closely adjacent said article to cool and shape the weld metal deposited on the article.

3. An electroslag welding machine for depositing metal onto an article, comprising a base means, a frame means supported on the base means, means on said base means for supporting an elongate, cylindrical steel mill roll thereon with the axis thereof extending vertically, a first movable platform supported on said frame means, welding means carried by said first movable platform for depositing weld metal on said article, a second movable platform supported on said frame means, and a cylindrical cooling and shaping means supported on said second movable platform with its axis substantially vertically disposed and positioned closely adjacent said roll in surrounding relationship thereto for cooling and shaping weld metal deposited on said article, said cooling and shaping means having opposite ends and a plurality of separate, helical coolant water passage means therein extending at least partially therearound and extending from one end to the other end thereof, inlet means communicating with each of the passage means at one end of the cooling and shaping means, and outlet means communicating with each of the passage means at the other end of the cooling and shaping means, to effect circulation of coolant water through each of said passage means from said one end to the other end of said cooling and shaping means thus to cool a molten puddle of weld metal deposited on said article between the article and the cooling and shaping means as said second movable platform and cooling and shaping means are moved vertically relative to said article.

4. An electroslag welding machine for depositing a layer of metal onto an article, comprising a frame means having a top and bottom, a centering device and base support means adjacent the bottom of said frame means for supporting and article thereon in centered relationship in said frame means, a top support and centering means carried by the frame means adjacent the top of said frame means for engaging said article at an upper portion thereof to maintain said article in a centered position in said frame means, said top support means including a first cylindrical portion secured to an upper portion of the frame means and extending vertically downwardly therefrom, said first cylindrical portion being laterally adjustable relative to said frame means for alignment of said top support means relative to said frame means and an article supported therein, a second, telescoping, cylindrical portion telescopically engaged with the first cylindrical portion for vertical adjustment relative thereto and to an article supported in the frame means for operative engagement and disengagement with articles of different vertical dimension, a chuck type adaptor secured to the lower end of said telescoping portion of said top support means for engaging and supporting articles of different horizontal dimension in centered relationship in said machine, welding means carried by a movable portion of the frame means for movement relative to the article, and cooling and shaping means carried by a movable portion of the frame means and disposed in closely spaced relationship to said article to define a space therebetween, said welding means including welding electrode means extending into said space into close proximity with said article to deposit weld metal on said article, and said cooling and shaping means being movable relative to said article to cool and shape the weld metal deposited thereon.

5. An electroslag welding machine for depositing weld metal onto an outer surface of an elongate article, comprising a base, a frame means supported on said base, means on said base for supporting said article thereon with the axis of the article vertically disposed, said frame means including a first vertically movable portion, welding means carried on said first vertically movable portion and positioned to deposit weld metal on said article, said frame means including a second vertically movable portion, a cooling and shaping means closely adjacent said article in coaxial surrounding relationship thereto to cool and shape the weld metal deposited on the article, said cooling and shaping means comprising a tubular, water cooled cooling ring, support means supporting said cooling and shaping means on said second vertically movable portion, said support means including a tubular cooling ring support bracket having upper and lower open ends and secured at the lower end thereof on said second vertically movable portion in coaxial, surrounding relationship with a lower end portion of the article, a cooling ring holder bracket having upper and lower open ends and secured at its lower end on the upper end of the cooling ring support bracket in coaxial alignment therewith and in coaxial, surrounding relationship with a lower end portion of said article, said cooling ring supported substantially concentrically within said cooling ring holder bracket and in close, surrounding relationship to said article.

6. An electroslag welding machine for depositing a layer of metal onto an article, comprising a frame means having a top and bottom, a centering device and base support means adjacent the bottom of said frame means for supporting said article thereon in centered relationship in said frame means, an upper support and centering means carried by the frame means adjacent the top of said frame means for engaging said article at an upper portion thereof to maintain said article in a centered position in said frame means, said upper support means being adjustable to accommodate articles of different size, welding means carried by the frame means for movement relative to the article, cooling and shaping means disposed in closely spaced relationship to said article to define a space therebetween, said welding means including welding electrode means extending into said space into close proximity with said article to deposit weld metal on said article, said cooling and shaping means being movable relative to said article to cool and shape the weld metal deposited thereon, and transfer means for transferring an article from a location remote from said frame means into position within said frame means and onto said centering device and base support means, said transfer means comprising a wheeled vehicle, support means on said wheeled vehicle for supporting said article thereon, said wheeled vehicle having spaced apart portions defining a space therebetween, said spaced apart portions adpated to extend on either side beyond said centering device and base support means to position an article supported on the wheeled vehicle in vertical alignment with the base support means, and lift means connected with said support means on said wheeled vehicle to lower the article onto said base support means and to lift it therefrom.

7. An electroslag welding machine as in claim 1, wherein said frame means includes four spaced apart, vertically extending, parallel support columns, said roof platform secured on the upper ends of said support columns, and said upper and lower platforms slidably arranged on said support columns for vertical movement relative thereto.

8. An electroslag welding machine as in claim 7, wherein said drive means comprises motor means, and means connected between said motor means and said upper platform for raising and lowering said upper platform.

9. An electroslag welding machine as in claim 8, wherein said drive means is secured on top of the roof platform, and lift screw means are connected with said upper platform and extend vertically upwardly to said roof platform, said motor means being connected with said lift screw means through suitable gear means for raising and lowering said upper platform.

10. An electroslag welding machine as in claim 9, wherein said lower platform is releasably connected to said upper platform through said spacer means, and said spacer means comprises a plurality of spacer columns releasably connected at their opposite ends to the upper and lower platforms, respectively.

11. An electroslag welding machine as in claim 1, wherein said welding electrode means are carried on an oscillator ring, said oscillator ring being connected to the upper platform for oscillating movement relative thereto.

12. An electroslag welding machine as in claim 11, wherein drive means is carried by said upper platform and operatively connected with said oscillator ring for causing oscillation of said oscillator ring and said welding electrode means carried thereby.

13. An electroslag welding machine as in claim 12, wherein said drive means includes reversible motor means and drive chain means connected between said motor means and said oscillator ring, and motor control means operatively connected with said chain means and said motor means for causing reverse operation of said motor means and movement of said chain means and said oscillator ring in a second direction after a predetermined amplitude of oscillation of said oscillator ring in a first direction.

14. An electroslag welding machine as in claim 13, wherein said control means comprises a sprocket engaged with said chain means, limit switch engaging means adjacent said sprocket means and connected with said sprocket means for movement therewith, limit switch means adjacent said limit switch engaging means in a position to be engaged by said limit switch engaging means upon predetermined movement thereof to determine the amplitude of oscillation of the oscillator ring.

15. An electroslag welding machine as in claim 14, wherein said welding means includes welding wire supply means on top of said upper platform, welding wire feed means connected to said oscillator ring for feeding said welding wire, and guide means connected to the wire feed means and positioned to guide the welding wire fed by the wire feed means into the space between the cooling and shaping means and the article.

16. An electroslag welding machine as in claim 15, wherein said wire feeding means and said electrode means are adjustably carried by said oscillator ring for vertical and lateral adjustment relative thereto and to said article.

17. An electroslag welding machine as in claim 1, wherein said article support pedestal has centering means thereon for supporting an article in centered relationship in said machine.

18. An electroslag welding machine as in claim 6, wherein said upper centering and support device includes a telescoping means which moves vertically up and down into and out of engagement with said article, said telescoping means enabling said upper centering and support device to accommodate different size articles.

19. An electroslag welding machine as in claim 18, wherein said article comprises an elongate, solid, cylindrical steel mill roll supported in said machine with the axis thereof extending vertically, and said lower platform has an entry slot through one side thereof to enable said roll to be positioned in the machine.

20. An electroslag welding machine as in claim 19, wherein said cooling and shaping means comprises a mold means positioned around said roll for cooling and shaping the weld metal deposited on the roll.

21. An electroslag welding machine as in claim 20, wherein said mold means is supported on top of said lower platform in surrounding relationship to said roll and includes a cooling ring support bracket attached to the lower platform in aligned centered relationship thereto and a cooling ring holder bracket supported on top of said cooling ring support bracket, said cooling and shaping means including a cooling and shaping ring supported inside said cooling ring holder bracket.

22. An electroslag welding machine as in claim 21, wherein said cooling and shaping means is water cooled and has a plurality of separate water coolant passages therein extending from the upper end to the lower end thereof.

23. An electroslag welding mahcine as in claim 3, wherein said cooling and shaping means comprises an inner cylinder having a tapered inner surface and a plurality of helical grooves or channels in the outer surface thereof, and an outer cylinder or sleeve welded or otherwise suitably secured over the outer surface of said inner cylinder for closing said grooves or channels to define a plurality of separate helical water passageways having inlets at the top of said cooling and shaping means and outlets at the bottom thereof.

24. An electroslag welding machine as in claim 23, wherein a separate insert is fitted within said inner cylinder of said cooling and shaping means, said insert having a cylindrical inner surface and a tapered outer surface of substantially the same size and shape as the tapered inner surface of said inner cylinder.

25. An electroslag welding machine as in claim 24, wherein said insert is formed of copper.

26. An electroslag welding machine as in claim 25, wherein said inner cylinder is formed of copper.

27. An electroslag welding machine as in claim 21, wherein said cooling ring holder bracket has a plurality of vertically extending slots therein opening upwardly through the upper end thereof, and a plurality of relatively short pipe fittings or nipples are connected with the inlets and outlets of said water passageways, said pipe fittings or nipples being received in said slots in said cooling ring holder bracket.

28. An electroslag welding machine as in claim 21, wherein conduit means are connected with said inlet pipe fittings or nipples and with an inlet header or manifold adjacent one edge of the lower platform, and conduit means are connected with the outlet pipe fittings or nipples and with an outlet header or manifold adjacent said inlet header or manifold at said one edge of said lower platform.

29. An electroslag welding apparatus as in claim 2, wherein said oscillating ring has a plurality of radially extending slots therein, said welding electrode support means are adjustably connected to said slots for movement therealong to adjust the radial position of said welding electrode means for accommodating articles of different size in said machine.

30. An electroslag welding apparatus as in claim 29, wherein said welding electrode support means is vertically adjustable relative to said oscillating ring and said article.

31. An electroslag welding apparatus as in claim 30, wherein welding wire supply means are supported on top of said upper platform for supplying welding wire to said welding electrode means, said welding wire being supported on wire guides on the upper platform for preventing crimping of the welding wire as it is fed from said supply means to said welding electrode means.

32. An electroslag welding apparatus as in claim 31, wherein wire feed means are mounted on said electrode support means for feeding the welding wire from the supply means to the electrode means.

33. An electroslag welding apparatus as in claim 32, wherein said cooling and shaping means is water cooled and includes a cooling ring having a plurality of helical water passages therein extending from the top to the bottom thereof, and water inlet and outlet means connected with the water passages adjacent the top and bottom thereof, respectively.

34. An electroslag welding apparatus as in claim 4, wherein said frame means includes a roof platform, said top support means being carried by the roof platform adjacent the center thereof.

35. An electroslag welding apparatus as in claim 34, wherein said upper portion of said top support means is adjustably fixed to the underside of said roof platform and extends vertically downwardly therefrom, said telescoping portion being telescopically received inside said first cylindrical portion, and drive rod means connected with the upper end of said telescoping portion and extending longitudinally through said first cylindrical portion to above said roof platform and connected to suitable drive means for raising and lowering said telescoping portion of said top support means.

36. An electroslag welding machine as in claim 35, wherein said telescoping portion extends downwardly through an opening in the center of an upper platform carried by said frame means, said welding electrode means being carried by said upper platform.

37. An electroslag welding machine as in claim 2, wherein said electrode support bracket means includes means for vertical and lateral adjustment of said bracket means and electrode means relative to said oscillating ring and said article.

38. An electroslag welding machine as in claim 37, wherein said welding electrode support means further includes wire feed means for feeding welding wire from a supply means carried on said platform to said welding electrode means.

39. An electroslag welding machine as in claim 2, wherein said flexible drive means comprises a chain means disposed in surrounding relationship to the marginal edge of said oscillating ring and secured to said oscillating ring at least at one point thereof.

40. An electroslag welding machine as in claim 39, wherein said reversible motor means is connected with said chain means through a worm gear reducer.

41. An electroslag welding machine as in claim 40, wherein said control means includes limit switch means operatively associated with said chain means for sensing the amplitude of oscillation of said oscillating ring to effect switching of said reversible motor from one direction of movement to another direction of movement upon a predetermined amount of travel of said chain means and oscillating ring.

42. An electroslag welding machine as in claim 41, wherein said control means includes a housing, a first axle disposed adjacent one side of said housing, a sprocket wheel mounted for rotation about the first axle and engaged with said chain means so that movement of said chain means causes rotation of said sprocket wheel, a second axle mounted in said housing spaced from said first axle, a second wheel mounted for rotation about said second axle, belt means engaged with a hub means on said sprocket wheel and with a hub means on said second wheel for causing rotation of said second wheel along with rotation of said sprocket wheel, and a pair of circumferentially spaced limit switch engaging means carried by said second wheel in a position to engage a respective one of a pair of limit switches mounted at opposite sides of said housing.

43. An electroslag welding machine as in claim 42, wherein a pair of substantially identical power units are connected with said reversible motor means to provide a fail safe arrangement so that in the event one of said power units fails, the other power unit is effective to continue operating said oscillating ring.

44. An electroslag welding machine as in claim 43, wherein said reversible motor means comprises a dual vane hydraulic motor.

* * * * *